INVENTOR.
CHRISTIAN A. EFF
BY Richard L. Caslin
HIS ATTORNEY

Feb. 6, 1968  C. A. EFF  3,367,316
OVEN FOR CLOSED DOOR BROILING
Filed April 18, 1966  2 Sheets-Sheet 2

INVENTOR.
CHRISTIAN A. EFF
BY *Richard L. Cashin*
HIS ATTORNEY

United States Patent Office 3,367,316
Patented Feb. 6, 1968

3,367,316
OVEN FOR CLOSED DOOR BROILING
Christian A. Eff, Louisville, Ky., assignor to General
Electric Company, a corporation of New York
Filed Apr. 18, 1966, Ser. No. 543,210
5 Claims. (Cl. 126—21)

ABSTRACT OF THE DISCLOSURE

A closed door broiling oven having an oven cavity with a radiant heat broiling means and means for sealing the oven door during a broiling operation. The oven also has an exhaust vent with an oxidation unit combined therewith. There is a restricted air opening beneath the door for creating a chimney effect for the exhaust vent. An oven temperature control is combined with the oven and it includes a temperature sensor adjacent one wall of the oven. External, forced air cooling means are provided for extracting heat from the walls of the oven cavity and also reducing the temperature of the sensor to prevent it from cycling. Finally the oven is provided with a blanket of thermal insulation surrounding the cooling means and an external oven housing or body structure.

---

The present invention relates to a design of an oven for broiling meat wherein it is possible to keep the oven door closed, while avoiding the escape of smoke, odors, grease and vapors from the oven.

The majority of broiling ovens used heretofore employ a top radiant heating means, and the meat is supported in a broil pan that is placed on a rack that is spaced from the radiant heating means by a distance which is a function of the rareness or amount of doneness of the meat. For well done, the meat should be close to the heater. For rare, the meat could be in the bottom of the oven. The oven door is propped open in a broil position, which is in a semi-closed position leaving a top gap of perhaps 3 or 4 inches measured from the top of the oven door to the oven body. The door is left partially open in order to permit enough ambient air to circulate through the oven for the purpose of keeping both the oven air and the oven temperature sensor cool and thereby permit the radiant heating means to be energized continuously and avoid the cycling ON and OFF of the power to the heating means.

The principal objection to open door broiling is that this large flow of ambient air causes the meat to be excessively dry. Moreover, it is inconvenient and expensive to filter the discharge air from the oven of its smoke, grease, odors and vapors. The discharge air could be vented directly to the outside of the kitchen; but this is not always practical, especially in older homes.

The principal object of the present invention is to provide a broiling oven with external means for cooling the walls of the oven liner during the broiling operation in order to keep the oven air relatively cool and the oven thermostat from cycling ON and OFF during closed door broiling.

A further object of the present invention is to provide an oven with cool oven liner walls so as to prevent food soil and grease spatter from being baked onto the walls and becoming discolored and unsightly, and thereby make it possible to remove the soil and spatter by use of a moist sponge.

A further object of the present invention is to provide a broiling oven of the class described with an oxidation unit so as to degrade all smoke, odors, grease and vapors which are generated during the broiling operation so that clean air may be returned to the kitchen atmosphere.

The present invention, in accordance with one form thereof, embodies an oven for closed door broiling having a metal oven liner with an access door forming an oven cooking cavity. A radiant heater is positioned in the top portion of the cooking cavity to serve as a broiling heater. There would be an oven temperature control system having a temperature sensor in heat transfer relation with the cooking cavity for controlling the energization of the radiant heater. A cooling medium is circulated in heat transfer relationship with the exterior of the oven liner for keeping relatively cool both the temperature sensor and the walls of the oven liner as well as the oven air so that meat may be broiled with the oven door in the closed position and the radiant heater energized continuously.

My invention will be better understood from the following description taken in conjunction with the accompanying drawings and its scope will be pointed out in the appended claims.

Figure 1:
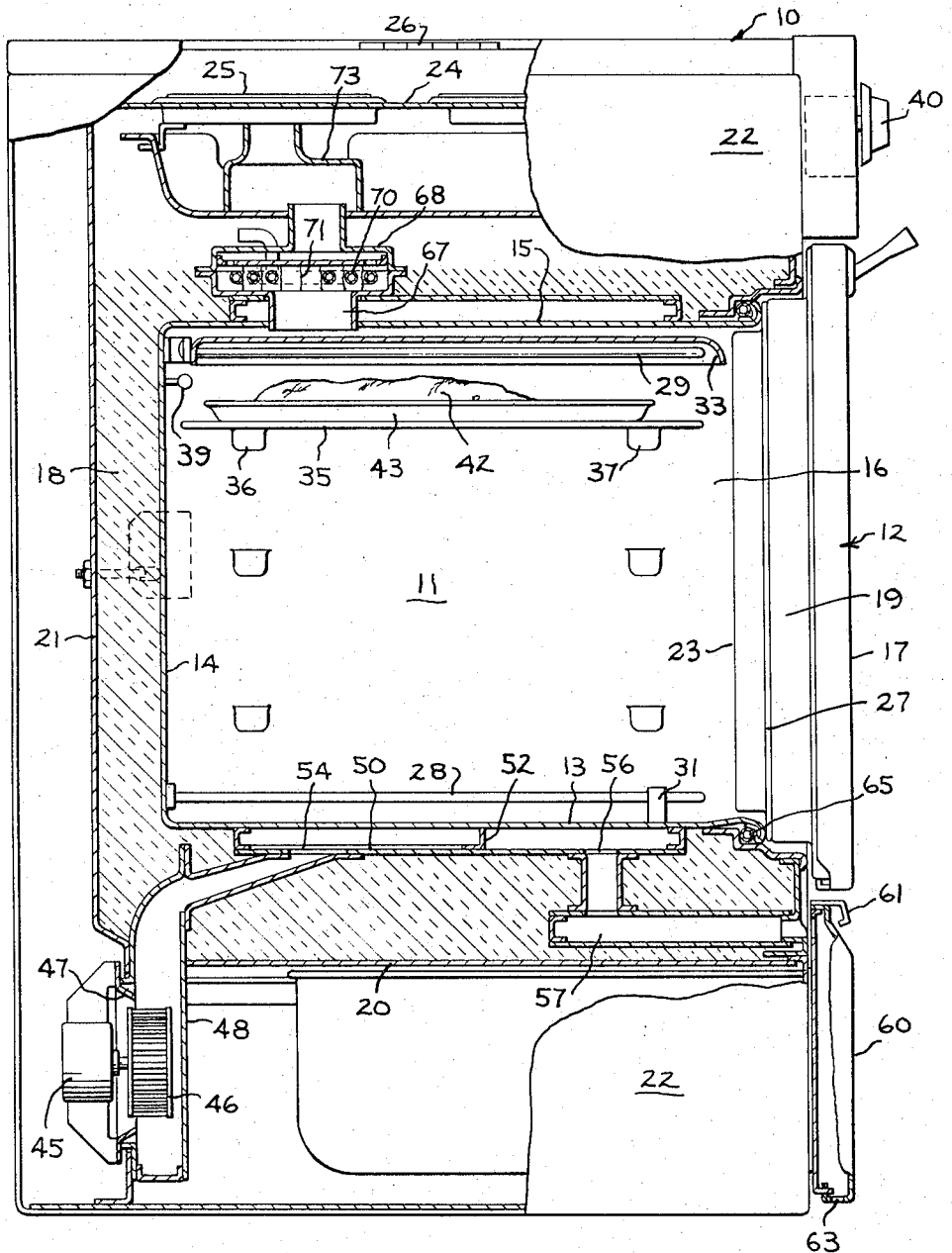
FIGURE 1 is a left-side elevational view of an electric range having a broiling oven embodying the present invention with some parts broken away and others in cross-section to show the principal elements which are used for closed door broiling.
Figure 3:
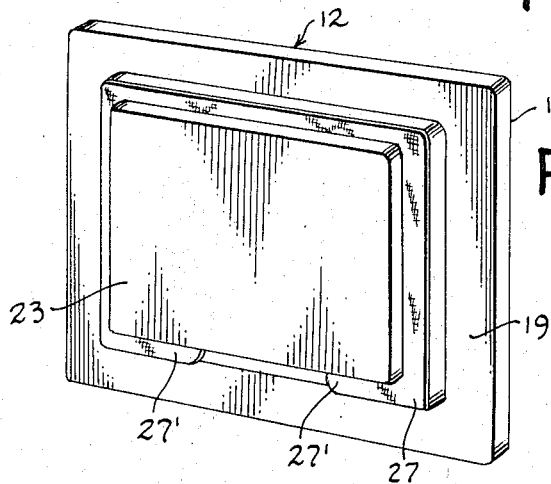

FIGURE 3 is a perspective view of the inside of the oven door of FIGURE 1 to show a restricted air inlet means for the oven cavity adjacent the bottom edge of the door. The design of the oven door is best illustrated in the patent to Clarence Getman No. 3,189,020 entitled "Oven Door With Floating Inner Panel," as well as in present FIGURE 3. There is an outer door panel 17, an inner door liner 19 and a floating inner panel 23. Moreover, there is a woven strip or belt 27 of thermal gasket material sandwiched between the inner door liner and the floating inner panel. The two ends 27', 27' of the gasket 27 are spaced apart from each other to create a restricted opening for the purpose of permitting a measured amount of room air to be drawn into the oven cavity to create a gentle chimney effect for the cavity.

Turning now to a consideration of the drawings and in particular to FIGURE 1, there is shown an electric range 10 having as its principal component a box-like oven liner 11 in combination with a front-opening access door 12 which form an oven cooking cavity. The oven liner 11 is of sheet metal construction having a bottom wall 13, back wall 14, top wall 15 and opposite side walls 16, 16. The front of the oven liner is open and it is adapted to be closed by the oven door 12, as is clearly illustrated.

As in standard oven designs, a layer of thermal insulating material 18 surrounds the oven liner on all five sides and serves to retain the heat present in the oven cavity so as to render the system thermally efficient. A sheet metal insulation guard 20 is present beneath the oven for supporting the insulation and similar vertical panels 21, as seen at the back of the oven, support the insulation at the back and the two sides. The oven is further provided with an outer casing or oven body 22 of decorative finish, such as porcelain enamel, to enclose the entire assembly.

This invention is shown as being built into a complete range having a top cooking surface or cooktop 24 assembled over the oven and including a plurality of surface heating units 25 formed of metal sheathed resistance heating elements, as is conventional in this art. Each surface heating unit 25 is provided with a multiple pushbutton selector switch 26 along one side edge of the cooktop 24 for controlling the degree of heating energy available.

The oven cavity is provided with two heating elements; namely, a lower baking element 28 and an upper broiling element 29, which are each in the form of a metal sheathed resistance heating element that is bent into a large loop and is provided with two terminal ends which extend through the back wall 14 of the oven liner for making electrical connections therewith. The baking element 28 is provided with a plurality of supporting clips or feet 31 for holding the baking element spaced off of the bottom wall 13 so as not to develop hot spots which might damage the porcelain enamel finish that covers the interior surface of the oven liner. The upper broiling element 29 is provided with a pan-shaped reflector 33 which overlies the broiling element and serves to direct the radiant energy downwardly into the oven cavity as well as to shield the upper wall 15 of the oven liner from the intense heat.

As in standard baking and broiling ovens, the oven cavity is provided with one or more oven racks 35 of welded wire construction which are adapted to be supported on rack-supporting embossments or shelves 36 and 37 which are formed on the opposite side walls 16 of the oven liner. The oven door 12 is also made of sheet metal panels that are fastened together, and its interior is substantially full of a thermal insulating material (not shown) such as fiber glass or the like so that the oven heat is retained within the cooking cavity for obtaining uniform cooking results no matter where the food might be placed within the oven.

A standard oven thermostatic control comprises a temperature sensor such as the fluid-filled bulb or probe 39 that is supported from the back wall 14 of the oven liner adjacent the top thereof, and a thermostatic switch or responder illustrated diagrammatically in FIGURE 1 as element 40, that is arranged in the front edge of the cooktop 24. The connection between the bulb 39 and the thermostat 40 would be by way of a capillary tube (not shown) so that the temperature sensed within the oven cavity is detected by the responder and a reaction takes place according to the manual temperature setting of the thermostat.

Normal cooking temperatures range from about 150° F. to about 550° F. The baking temperatures vary between about 150° F. and 400° F., while the broil position of the thermostat is a single, fixed high temperature position preferably where the broiling element 29 would be energized continuously during the broiling operation.

As mentioned previously, the majority of broiling ovens have used an open door technique where the oven door 12 would be propped in a partially open position. The oven thermostat 40 would be set to the broil position for energizing the heating element 29 continuously at its rated wattage of about 3,000 watts. For broiling meat RARE, the oven rack 35 would be raised to its highest position as shown in FIGURE 1 and the meat 42 to be cooked would be placed in a special broil pan 43, which is usually provided with a perforated insert (not shown) that supports the meat off the bottom wall of the pan 43. For broiling meat WELL DONE, the oven rack would be lowered away from the broil element so that the meat could be cooked for a longer time without charring the outside of the meat. The perforations allow the grease to flow into the bottom of the pan and the grease would be shielded from the radiant heat of the broil element 29 so as to reduce the amount of smoke, odors, and vapors that are generated during the broiling operation.

The present invention departs from the past practice by adopting a closed door broiling system wherein the oven cooking cavity is kept substantially closed, during the broiling operation. In the past, the oven door 12 was left open mainly to allow for a large circulation of ambient air to cool the oven air as well as the temperature sensor 39.

Figure 2:
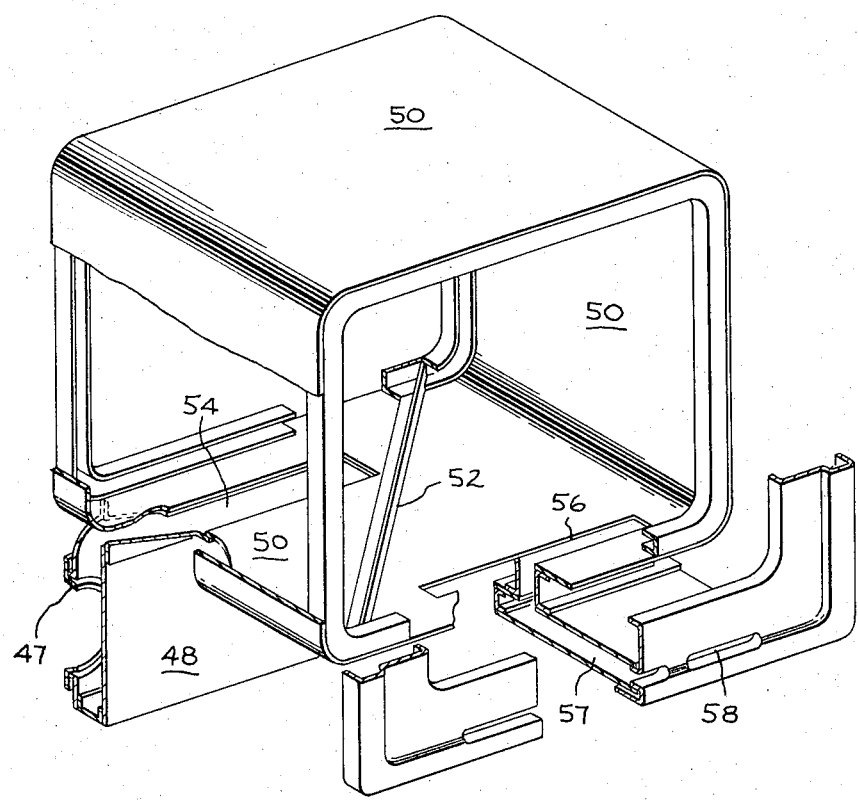
FIGURE 2 is a fragmentary perspective view of the walls which are spaced outwardly from the oven liner (not shown) to form air cooling channels or passages for circulating around the oven liner so that the oven liner serves as a heat exchanger and is kept relatively cool during the closed door broiling operation.

In the present invention, when the oven door 12 is kept closed some means must be provided for cooling the oven air and the oven temperature sensor 39. These tasks are performed by an external cooling medium which in effect washes the metal walls of the oven liner 11 so that the oven liner serves as a heat exchanger and its walls remain at a temperature between about 300° F. and 500° F. during the broiling operation. Looking at FIGURE 1 there is shown a motor 45 and blower wheel 46 which is located in the range beneath the oven for drawing ambient air through an air intake opening 47 at the back of the range. Assembled around the blower wheel 46 is an air duct 48 which conveys the forced air toward the oven liner 11. Surrounding the bottom wall 13, side walls 16—16 and the top wall 15 is a sheet metal housing 50 which is closely spaced from the related walls of the oven liner by about one or two inches. In other words, the oven liner 11 fits telescopically into a larger sheet metal housing or liner 50, as can best be visualized from FIGURE 2 wherein the oven liner 11 has been removed. It should be recognized that while the illustrated design merely shows air passages surrounding only the four walls of the oven liner and not the back wall 14, an alternative having air passages surrounding all of the walls of the oven liner is within the intended scope of the present invention. Another modification would be to employ narrow air ducts or air tubes around the oven liner as a heat exchange method in place of the complete air channels as are shown.

A diagonal partition or angle iron 52 is positioned in the air channel beneath the bottom walls 13 of the oven liner 11 and extends from one back corner to the diagonally opposite front corner to form a partition or air diverter. The air duct 48 leads toward the bottom wall 50 of the enclosure for the oven liner and there is a large rectangular opening 54 to permit the air from the duct 48 to enter the air passages. Because of the presence of the partition or air diverter 52, the air is allowed to sweep over only one half of the bottom wall 13 of the oven liner and then it rises up one side of the oven liner thereby cooling the sidewall thereof, and then it passes over the top wall 15 of the oven liner and then down over the opposite side wall 16 of the oven liner, and finally under the remaining half of the bottom wall 13 of the oven liner until it reaches a rectangular-shaped outlet 56 from which the air is carried through an air duct 57 toward the front of the range body where it escapes through a plurality of horizontally disposed elongated slots 58. Turning back to FIGURE 1, the air outlet 56 is shown in the bottom wall of the panel 50 toward the front of the oven liner and the air duct 57 extends forwardly to an area beneath the bottom edge of the oven door 12.

In a standard range, a storage drawer is usually provided beneath the oven and this is shown in FIGURE 1 by way of the front door panel 60. This drawer would serve mainly for storing pots and pans and other cooking utensils. The front drawer panel is provided with a drawer pull or handle 61 for ease in grasping the drawer and moving it between its open and closed positions. Rather than having the air from the cooling system discharging directly into the kitchen it was deemed preferable to have the drawer panel 60 serve as a diverter that overlies the exhaust slots 58 of the exhaust duct 57 and hence spread out the air flow pattern by carrying the air through the interior of the drawer panel so that it may exhaust out through the slots 63 in the lower edge of the front drawer panel 60.

An unobvious result was discovered during the construction and testing of the present broiling oven invention having an oven liner with cool walls; namely, the fact that the food soil and grease spatter does not bake onto the walls of the oven liner and hence the soil and grease does not discolor or decompose as readily due to the heat; and less smoke, odors and vapors are generated.

One important modification would be to combine this invention of a closed door broiling oven having cool walls with a self-cleaning oven design using the principle of pyrolysis as is disclosed and claimed in the patent of Bohdan Hurko No. 3,121,158 which is also assigned to the General Electric Company, the assignee of the present invention. Since the oven soil does not bake on as readily as in standard ovens, the pyrolytic process of the Hurko patent would perform satisfactory cleaning of the oven soil within a shorter time span. For this reason this closed door broiling oven has been illustrated in the drawings as being built into a self-cleaning oven, as is evident from the fact that there is a third metal sheathed resistance heating element or mullion heater 65 shown in FIGURE 1 as encompassing the front of the oven liner. The inner portion of the oven door 12 is telescopically arranged within the mullion heater 65 so that the inner surface of the oven door is heated so as to obtain generally uniform temperatures of the walls of the oven cavity during the high temperature pyrolytic process where the wall temperatures reach a maximum somewhere between about 750° F. and about 950° F.

It will be immediately apparent that during this high temperature heat cleaning operation the motor blower units 45, 46 would not be operating because the cooling action afforded thereby would be working against the heating elements in the oven which are trying to heat up the walls rather than to cool them down as is important during the closed door broiling operation.

Most if not all ovens are provided with a venting or exhaust system such as the oven vent 67 shown in the top wall 15 of the oven liner toward the back thereof. This oven vent is of special design in that it is supplied with a catalytic oxidation unit 68 of the type that is disclosed in the U.S. Patent No. 2,900,483 to Stanley B. Welch, which is also assigned to the assignee of the present invention. Housed within this unit is a coiled resistance heating element 70 and a plurality of rings or layers of wire screen 71 that are coated with a catalytic material such as platinum which is especially adapted to promote the oxidation of carbon and carbon compounds so as to eliminate smoke, carbon monoxide and other objectionable gaseous products exhausting from the oven cavity. The oven gases pass through the oxidation unit 68 and into an exhaust duct 73 having a circuitous path, but which ultimately discharges beneath one of the surface heating units 25 in the cooktop 24. The broil reflector pan 33 would be cut back in the area adjacent the opening to the oven vent 67 so as not to restrict the flow of gases to the vent as might be concluded from the two dimensional showing in FIGURE 1.

Another benefit is derived from combining the present closed door broiling oven system with a self-cleaning oven system so that both systems could share the use of the oxidation unit 68. For instance, during the broiling operation some small amount of smoke, odors and grease would be generated and these could be degraded by the oxidation unit so that the broiling oven would not have to be vented to the outside of the kitchen but may filter or clean the air so that the air may be returned to the kitchen. The same condition prevails during the self-cleaning pyrolytic process.

Modifications of this invention will occur to those skilled in this art, therefore, it is to be understood that this invention is not limited to the particular embodiments disclosed but that it is intended to cover all modifications which are within the true spirit and scope of this invention as claimed.

What I claim as new and desire to secure by Letters Patent of the United States is:

1. A domestic oven comprising inner walls defining an oven cooking cavity, one wall having an access opening and a door for closing said opening, radiant heating means for broiling food placed within the oven cavity, oven temperature control means including a temperature sensor adjacent one of the oven walls, wall means spaced around at least the bottom, side walls and top of the said inner walls to form external cooling air channels for the walls of the cooking cavity, blower means for forcing relatively cool room air through the air channels and around the walls of the cooking cavity, a room air inlet means for the blower means, and an air outlet means from the air channels to the atmosphere, whereby the walls of the cooking cavity serve as a heat exchanger so as to hold down the temperature of both the temperature sensor and said last-mentioned walls and thereby prevent the sensor from cycling and also reduce the amount of smoke and odors generated during normal broiling operations, the oven cavity having an exhaust vent with an oxidation unit combined therewith for degrading smoke, odors and vapors generated during the broiling operation, means for sealing the oven door in the closed position during a broiling operation, and a restricted air opening for the oven cavity to create a gentle chimney effect of room air through the cavity and out the oven exhaust vent, and a thermal insulating layer surrounding the said wall means and the oven cavity walls, and an external oven body surrounding the said insulating layer.

2. A broiling oven comprising a box-like metal oven liner and a front-opening oven door that is adapted to close the oven liner and form an oven cooking cavity, radiant heating means for the oven cavity for cooking foods placed therein, oven temperature control means including a temperature sensor adjacent one of the oven walls, a layer of thermal insulating material surrounding the metal oven liner, and an outer oven casing surrounding the said layer, the oven heating means including a heating means adjacent the top portion of the oven cavity for use in broiling foods, and an oven exhaust vent communicating with the oven liner, an oxidation unit combined with the oven vent for degrading smoke, odors and vapors generated during the broiling operation and exhausting them to the atmosphere; the invention comprising external air channels surrounding substantially all of the walls of the oven liner and located between the oven liner and the layer of insulation, blower means for forcing relatively cool ambient air through the air channels, air inlet means communicating with the said blower means, an air exhaust means for the air channels for returning the cooling air to the room atmosphere, whereby the external cooling air holds down both the temperature of the sensor and the temperature of the oven walls, means for sealing the oven door in the closed position during a broiling operation, the oven door being closed during broiling operation, and a restricted source of ambient air for the oven cavity to assist in sweeping any smoke and odors in the oven cavity through the oven vent and oxidation unit.

3. An oven for closed door broiling comprising a box-like oven liner and an access door, a top radiant heating means for broiling food placed therein, means for controlling the oven temperature including a temperature sensor located adjacent the top of the back of the oven cavity, spaced walls surrounding the oven liner and creating external air passages for withdrawing heat from the walls of the oven liner and also holding down the temperature of said temperature sensor so as to prevent it from cycling, blower means for forcing room air through the passages, partitions for the air passages to cause the air flow to sweep generally in one direction around the oven liner, an air inlet means adjacent the said blower means, air exhaust means connecting the air passages to the atmosphere, the oven liner having an exhaust vent with an oxidation unit combined therewith for degrading smoke, odors and vapors generated during the broiling operation, means for sealing the oven door in the closed position during a broiling operation, and a restricted air opening for the oven cavity to create a gentle chimney effect of room air through the cavity and out the oven exhaust vent, thermal insulating material surrounding the oven liner and said spaced walls, and an outer casing enclosing the before-mentioned oven structure.

4. An oven for closed door broiling comprising a box-like oven liner and an access door forming an oven cooking cavity, a radiant heater positioned in the top portion of the cooking cavity, an oven temperature control system comprising a temperature sensor in heat transfer relation with the top portion of the cooking cavity for controlling the energization of the radiant heater, an oven rack supported in the oven liner and adapted to support a broil pan thereon, the oven cavity having an exhaust vent with an oxidation unit combined therewith for degrading smoke, odors and vapors generated during the broiling operation, means for sealing the oven door in the closed position during the broiling operation, and a restricted air opening adjacent the bottom of the oven door to create a gentle chimney effect for the oven exhaust vent, wall means encircling the outside of the oven liner to form external air cooling channels around most of the oven liner, air intake means for the channels, blower means for forcing ambient air through the channels for extracting heat from the oven liner, and an exhaust means for the air channels for discharging the cooling air into the atmosphere.

5. An oven for closed door broiling as recited in claim 4 wherein the said blower means is located beneath the oven and draws ambient air from the back portion of the oven and forces it into the cooling channels, partitions in the channels directing the flow of air to travel in one direction around the oven liner, the air channel exhaust means being located beneath the oven door, and an air diverting means positioned over the said exhaust means to spread out the air flow pattern in a generally downward direction and also lower its velocity.

References Cited
UNITED STATES PATENTS

| | | | |
|---|---|---|---|
| 2,860,026 | 11/1958 | Long | 126—21 |
| 3,081,392 | 3/1963 | Warner | 126—21 |
| 3,121,158 | 2/1964 | Hurko | 126—19 X |
| 3,215,816 | 11/1965 | Perl | 219—400 |

FREDERICK L. MATTESON, Jr., *Primary Examiner.*

JAMES W. WESTHAVER, *Examiner.*

E. G. FAVORS, *Assistant Examiner.*